US010094290B2

(12) United States Patent
Koganezawa et al.

(10) Patent No.: US 10,094,290 B2
(45) Date of Patent: Oct. 9, 2018

(54) TWO-SHAFT GAS TURBINE

(71) Applicant: MITSUBISHI HITACHI POWER SYSTEMS, LTD., Yokohama (JP)

(72) Inventors: Tomomi Koganezawa, Yokohama (JP); Kazuki Abe, Yokohama (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 386 days.

(21) Appl. No.: 14/790,603

(22) Filed: Jul. 2, 2015

(65) Prior Publication Data
US 2016/0003155 A1   Jan. 7, 2016

(30) Foreign Application Priority Data

Jul. 3, 2014   (JP) .................................. 2014-137616

(51) Int. Cl.
F02C 6/00  (2006.01)
F02C 7/22  (2006.01)
(Continued)

(52) U.S. Cl.
CPC .................. *F02C 7/22* (2013.01); *F02C 3/10* (2013.01); *F02C 3/107* (2013.01); *F02C 9/18* (2013.01);
(Continued)

(58) Field of Classification Search
CPC .... F02C 3/10; F02C 3/107; F02C 7/22; F02C 9/18; F02C 9/52; F02C 9/54;
(Continued)

(56) References Cited

U.S. PATENT DOCUMENTS 4,539,810 A * 9/1985 Watanabe ................ F02C 3/10
                                                            60/39.25
2004/0035117 A1* 2/2004 Rosen .................... F01K 21/047
                                                            60/772
(Continued)

FOREIGN PATENT DOCUMENTS

EP   2 119 891 A2   11/2009
JP   6-307259 A     11/1994
(Continued)

OTHER PUBLICATIONS

Extended European Search Report received in corresponding European Application No. 15174987.6 dated Nov. 26, 2015.
(Continued)

*Primary Examiner* — Jesse Bogue
(74) *Attorney, Agent, or Firm* — Mattingly & Malur, PC

(57) ABSTRACT

A two-shaft gas turbine is provided which includes: a compressor; a combustor having multiple fuel systems and generating combustion gas by combusting fuels from the fuel systems and air compressed by the compressor; a high-pressure turbine coupled coaxially with the compressor and rotated by the combustion gas; a low-pressure turbine having a shaft structure independent of the high-pressure turbine and rotated by exhaust gas from the high-pressure turbine; an air extraction channel for extracting the air compressed by the compressor; an injection flow channel for feeding the air extracted through the air extraction channel back to the combustor; and a controller for controlling the flow rate of the fuel supplied to each of the fuel systems based on the air flow rate of the compressor, on the flow rate of the fuel supplied to the combustor, and on the temperature of the air in the injection flow channel.

6 Claims, 8 Drawing Sheets

(51) Int. Cl.
*F02C 3/10* (2006.01)
*F02C 9/18* (2006.01)
*F02C 3/107* (2006.01)
*F02C 9/52* (2006.01)
*F02C 9/54* (2006.01)

(52) U.S. Cl.
CPC .................. *F02C 9/52* (2013.01); *F02C 9/54* (2013.01); *F05D 2270/082* (2013.01); *F05D 2270/303* (2013.01); *F05D 2270/313* (2013.01)

(58) Field of Classification Search
CPC ......... F05D 2270/082; F05D 2270/303; F05D 2270/313
See application file for complete search history.

(56) References Cited

U.S. PATENT DOCUMENTS

| | | | | |
|---|---|---|---|---|
| 2004/0055273 | A1* | 3/2004 | Hirayama | F02C 9/28 60/39.281 |
| 2005/0056021 | A1* | 3/2005 | Belokon | F02C 3/113 60/772 |
| 2007/0021899 | A1* | 1/2007 | Griffin | F02C 9/34 701/100 |
| 2009/0320438 | A1 | 12/2009 | Koganezawa et al. | |
| 2010/0005808 | A1* | 1/2010 | Nanataki | F02C 9/20 60/773 |
| 2011/0041510 | A1* | 2/2011 | Sasaki | F02C 9/28 60/776 |
| 2012/0017600 | A1* | 1/2012 | Saito | F02C 9/263 60/773 |

FOREIGN PATENT DOCUMENTS

| | | |
|---|---|---|
| JP | 4464226 B2 | 5/2010 |
| JP | 2012-47083 A | 3/2012 |
| JP | 4972533 B2 | 7/2012 |
| JP | 2012-172587 A | 9/2012 |
| JP | 2013-15146 A | 1/2013 |

OTHER PUBLICATIONS

Japanese Office Action received in corresponding Japanese Application No. 2014-137616 dated Oct. 3, 2017.

* cited by examiner

TWO-SHAFT GAS TURBINE

BACKGROUND OF THE INVENTION

1. Field of the Invention

The present invention relates to a two-shaft gas turbine equipped with a gas generator and a power turbine and structured so that compressed air flows back to a combustor via outside the gas turbine. More particularly, the invention relates to gas turbine fuel control to ensure stable fuel combustion at start-up of the gas turbine.

2. Description of the Related Art

A typical two-shaft gas turbine includes a gas generator that includes a compressor, a combustor having multiple fuel systems, and a high-pressure turbine coupled coaxially with the compressor; and a power turbine (low-pressure turbine) coupled with a load (e.g., generator), the rotating shaft of the gas generator being separated from that of the power turbine. With this type of gas turbine, the rotating speed of the high-pressure turbine and that of the low-pressure turbine can be controlled independently of each other.

Japanese Patent No. 4972533 discloses a one-shaft gas turbine furnished with a humidifier and a recuperator as equipment external to the gas turbine, as well as multiple fuel systems. This one-shaft gas turbine is equipped with an air extraction channel for supplying compressed air to the humidifier and an injection flow channel for injecting air coming from the recuperator into the combustor. The cited Japanese patent further discloses a method by which, when combustion air varies in temperature depending on the temperature state of the recuperator, the fuel systems are switched (i.e., the number of fuel systems to be ignited is selectively increased or decreased) on the basis of the relationship between electric power generation and combustion air temperature so that gas turbine operability and fuel stability are both ensured.

Furthermore, Japanese Patent No. 4464226 discloses a control method by which, when combustion air temperature varies in a plant equipped with a one-shaft gas turbine having a humidifying tower and a recuperator as external equipment, output auxiliary control factors are corrected on the basis of combustion air temperature so that the plant may be started up quickly and stably.

SUMMARY OF THE INVENTION

Consider the case where the gas turbine coupled with the generator as the load is started up and operated at rated rotating speed under no load condition. Where the gas turbine is a one-shaft gas turbine coupled coaxially with the compressor and generator, the fuel systems of the gas turbine are not switched (combustion mode switchover not performed) until the operation at rated rotating speed under no load condition is attained. At rated rotating speed under no load condition, the turbine is rotated with the energy of injected fuel, and the output of the turbine is used to drive the compressor. Under no load condition, there is little need for the power to drive the generator.

On the other hand, where the gas turbine is a two-shaft gas turbine operated at rated rotating speed under no load condition, there is little need for the energy to rotate the power turbine. That means fuel flow rate is lower than in the one-shaft gas turbine. In this case, the gas generator is rotated at a lower speed because it drives the compressor by smaller turbine output than the one-shaft gas turbine. The rotating speed of the gas generator is then maintained by performing control to narrow the opening of the inlet guide vane (IGV) of the compressor and thereby reduce inlet air flow in order to increase air-to-fuel ratio (fuel mass of air-fuel mixture divided by air mass). If the power turbine of the two-shaft gas turbine is used as a machine driver coupled with a rotary machine (driven equipment) such as a pump, the rotating speed and air-to-fuel ratio in effect when the start-up of the gas turbine is completed may be even higher than if the generator is driven depending on the load on the driven equipment.

As described above, the air-to-fuel ratio of the two-shaft gas turbine upon completion of its start-up tends to be higher than the one-shaft gas turbine. It may also be necessary to perform "combustion mode switchover" in order to keep optimal the combustion state of the combustor equipped with multiple fuel systems under partial rotating speed condition prior to the start of power generation (i.e., before the operation at rated rotating speed under no load condition is attained).

In particular, there may be a case where the two-shaft gas turbine is structured in such a manner that compressed air (combustion air) from the compressor is extracted to outside the gas turbine before being fed back to the combustor inside the gas turbine (e.g., where a bypass pipe couples the compressor with the combustor outside the gas turbine, or where compressed air is injected into the combustor after being forwarded through external equipment such as the humidifying tower and recuperator). In this case, the heat exchange taking place while compressed air passes through the structure lowers air temperature and thereby raises the air-to-fuel ratio of the air-fuel mixture being injected into the combustor. This further increases the need to perform combustion mode switchover in order to maintain stable, low NOx combustion even at partial rotating speed under no load condition.

In that respect, the above-cited U.S. Pat. Nos. 4,972,533 and 4,464,226 both relate to the techniques for the one-shaft gas turbine that have no need for performing combustion mode switchover at partial rotating speed under no load condition in the first place. Furthermore, the technique of Japanese Patent No. 4972533 involves switching combustion modes based on electric power generation and combustion air temperature, so that even if attempts were made to perform combustion mode switchover under partial rotating speed condition before the start of power generation, this technique cannot be applied at that stage.

An object of the present invention is to provide a two-shaft gas turbine that maintains stable, low NOx combustion even when combustion air temperature is varied by combustion air (compressed air) being extracted to outside the gas turbine before completion of its start-up (especially at partial rotating speed under no load condition).

In achieving the foregoing and other objects of the present invention and according to one embodiment thereof, there is provided a two-shaft gas turbine including: a compressor having an intake equipped with an inlet guide vane; a combustor having multiple fuel systems capable of being supplied with fuels independently of one another and generating combustion gas by combusting the fuels from the multiple fuel systems and air compressed by the compressor; a high-pressure turbine coupled coaxially with the compressor and rotated by the combustion gas from the combustor to drive the compressor; a low-pressure turbine having a shaft structure independent of the high-pressure turbine and rotated by exhaust gas from the high-pressure turbine to drive a load; an air extraction channel for extracting the air compressed by the compressor to outside the gas turbine; an injection flow channel for feeding the air extracted through the air extraction channel back to the combustor; and a controller for controlling the flow rate of the fuel supplied to each of the multiple fuel systems based on the air flow rate of the compressor, on the flow rate of the fuel supplied to the combustor, and on the temperature of the air in the injection flow channel.

According to the present invention, when compressed air is extracted to outside the two-shaft gas turbine before completion of its start-up so that the temperature of the compressed air is thereby varied, the fuel systems of the gas turbine can be switched in a manner maintaining stable, low NOx combustion.

BRIEF DESCRIPTION OF THE DRAWINGS

Further objects and advantages of the present invention will become apparent upon a reading of the following description and appended drawings in which.

DESCRIPTION OF THE PREFERRED EMBODIMENTS

First Embodiment

Some preferred embodiments of the present invention are explained below by use of the accompanying drawings.

Figure 1:
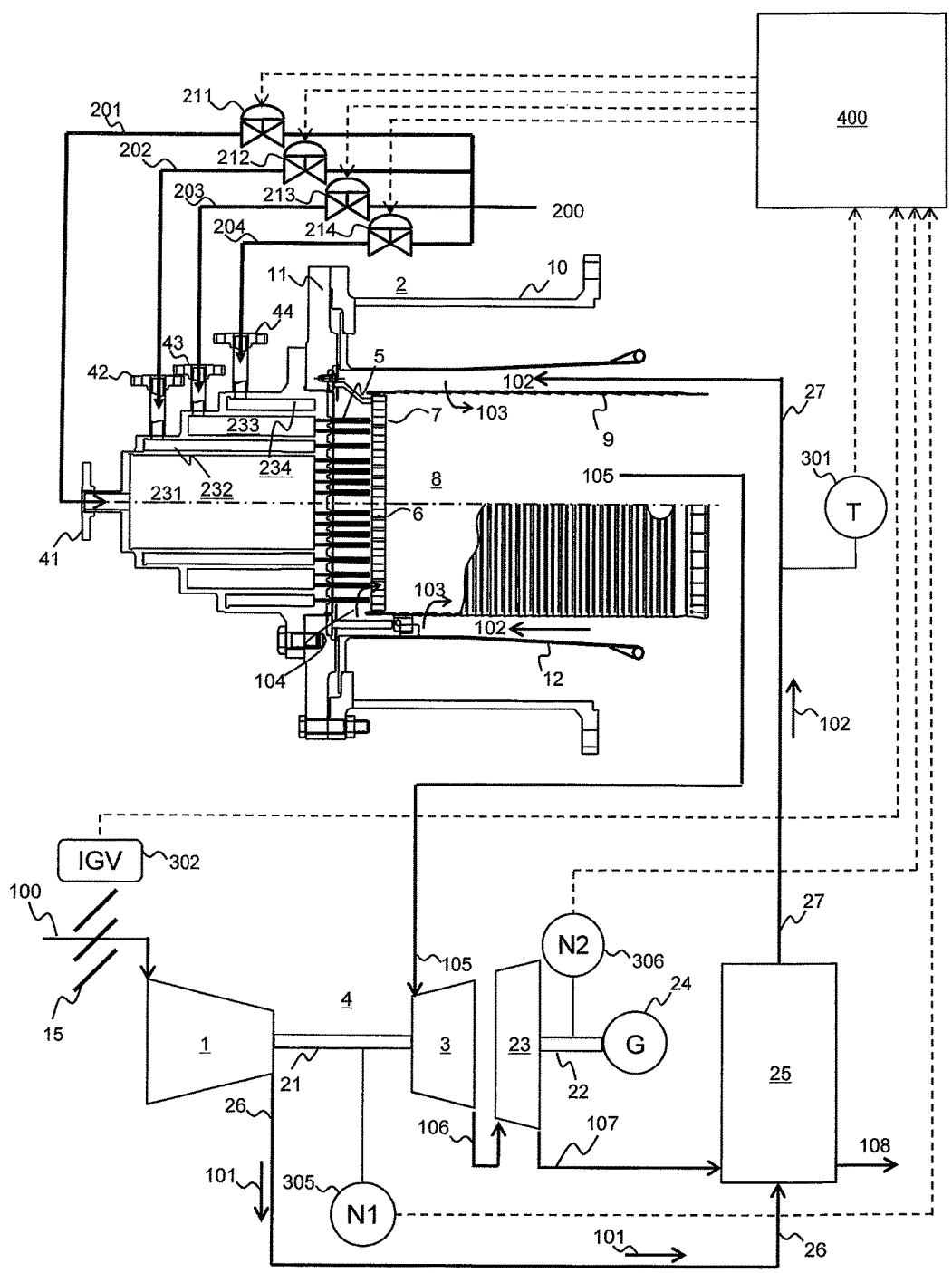
FIG. 1 is an overall schematic diagram of a two-shaft gas turbine as a first embodiment of the present invention.

FIG. 1 is an overall schematic diagram of a two-shaft gas turbine as the first embodiment of the present invention.

As shown in FIG. 1, the two-shaft gas turbine is principally made up of a gas generator 4, a power turbine 23, an air extraction channel 26, external equipment 25, an injection flow channel 27, and a controller 400.

The gas generator 4 is mainly includes a compressor 1 that has an intake equipped with an inlet guide vane (IGV) 15 and generates high-pressure compressed air 101 by compressing air 100, a combustor 2 that generates combustion gas 105 by combusting compressed air 102 coming from the compressor 1 via the external equipment 25 and fuels 201 through 204, and a high-pressure turbine 3 driven to rotate by the combustion gas 105 generated by the combustor 2. The compressor 1 is coupled with the high-pressure turbine 3 by the same rotating shaft 21 of the gas generator 4, so that the compressor 1 is driven by the high-pressure turbine 3.

The air extraction channel 26 serves to extract the compressed air 101 compressed by the compressor 1 and feed the extracted compressed air to the equipment 25 external to the gas turbine. The external equipment 25 performs predetermined processes on the compressed air 101 taken into the equipment 25 via the air extraction channel 26 before discharging the processed air into the injection flow channel 27. For example, the external equipment 25 corresponds to a humidifying tower that humidifies the compressed air 101 and a recuperator that heats the compressed air 101 through heat exchange with exhaust gas of the gas turbine. The injection flow channel 27 serves to feed the compressed air 102 discharged from the external equipment 25 back to the combustor 2. The combustor 2 is furnished with multiple fuel systems that can be supplied with fuels independently of one another. In the first embodiment, the combustor 2 is equipped with four fuel systems into which the fuels 201 through 204 are injected.

Meanwhile, the power turbine (low-pressure turbine) 23 is driven by combustion gas 106 from the high-pressure turbine 3 of the gas generator 4. The rotating shaft 22 of the power turbine 23 has a shaft structure independent of the rotating shaft 21 of the gas generator 4. A generator 24 acting as the load is coupled with and driven by the power turbine 23 via the rotating shaft 22. The rotating speed N1 of the gas generator 4 and the rotating speed N2 of the power turbine 23 are measured by rotation speed indicators 305 (N1) and 306 (N2), respectively, and are controlled independently by the controller 400.

A method for controlling the rotating speeds is explained next. First, the rotating speed of the power turbine 23 is controlled by the controller 400 varying the angles of fuel flow control valves 211 through 214 attached to the four fuel systems respectively so as to control the flow rates of the fuels 201 through 204 independently of one another. When the power consumption of the generator 24 increases independently of other generators, the rotating speed of the generator 24 and that of the power turbine 23 are lowered. In this case, the flow rates of the fuels 201 through 204 are raised on the basis of the difference between a target rotating speed and the actual rotating speed N2 (N2 is detected by the rotation speed indicator 306 and input to the controller 400), so that the actual rotating speed N2 is controlled at the target speed. Conversely, when the power consumption of the generator 24 decreases, the rotating speed of the generator 24 and that of the power turbine 23 are increased. In this case, the flow rates of the fuels 201 through 204 are reduced on the basis of the difference between the target speed and the actual rotating speed N2, so that the actual rotating speed N2 is always controlled at the target speed.

On the other hand, where the generator 24, along with the other generators, is synchronized with the power grid, the actual rotating speed N2 of the generator 24 and power turbine 23 matches the frequency of the power grid. In this case, the flow rates of the fuels 201 through 204 are controlled to be raised or reduced in proportion to an increase or a decrease in the output demand to the generator 24 instead of the actual rotating speed N2 being directly controlled.

Figure 2:
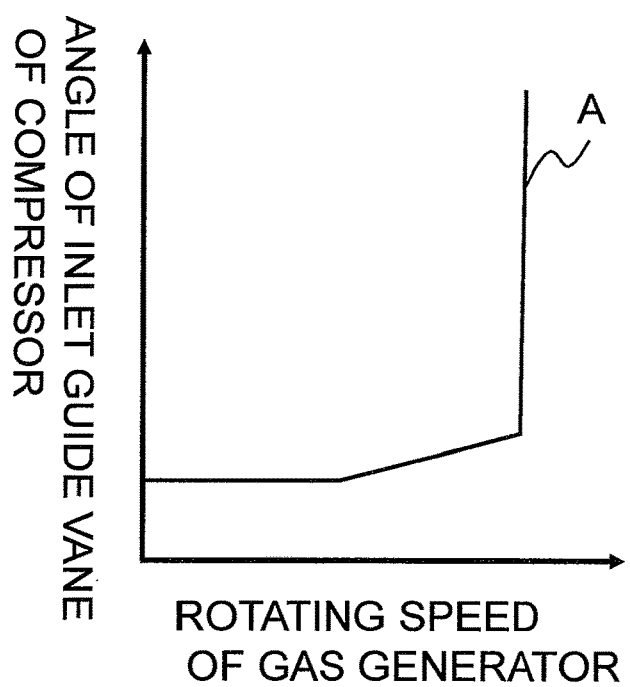
FIG. 2 is a diagram sowing the relationship between the rotating speed of a gas generator (high-pressure turbine rotating speed) and the angle of inlet guide vane of a compressor.

The control of the rotating speed N1 of the gas generator 4 is explained next (N1 is detected by the rotation speed indicator 305 and input to the controller 400). Whereas the fuel flow rates are determined by controlling the rotating speed of the power turbine as discussed above, the increase or decrease in the fuel flow rates also raises or lowers the output of the high-pressure turbine 3. In this case, the angle of the inlet guide vane 15 is controlled to be varied so that the output of the high-pressure turbine 3 will balance with the power of the compressor 1. Specifically, as shown in FIG. 2, when the output of the high-pressure turbine 3 rises in conjunction with the increase in the fuel flow rates boosting the rotating speed N1 (on the horizontal axis of FIG. 2), the angle of the inlet guide vane is controlled to be increased (on the vertical axis of FIG. 2). This raises the power of the compressor 1 so that the output of the high-speed turbine 3 balances with the power of the compressor 1. Conversely, when the output of the high-pressure turbine 3 drops in conjunction with the decrease in the fuel flow rates lowering the rotating speed on the horizontal axis of FIG. 2, the angle of the inlet guide vane is controlled to be reduced on the vertical axis of FIG. 2. This lowers the power of the compressor 1 so that the output of the high-speed turbine 3 also balances with the power of the compressor 1. In the high speed range, as indicated by a solid line A in FIG. 2, the rotating speed N1 of the gas generator 4 can be controlled to remain constant by significantly varying the angle of the compressor inlet guide vane 15.

The combustor 2 is explained next with reference to the upper portion of FIG. 1 showing a schematic cross-sectional view of the combustor 2.

The combustor 2 is equipped with numerous fuel nozzles 5 that injects the fuels 201 through 204, an air vent plate 7 shaped substantially as a disk having numerous air vents 6 which face the fuel nozzles 5 and through which combustion air 104 passes, a combustor liner 9 arranged downstream and circumferential of the air vent plate 7 and shaped substantially as a cylinder constituting a combustion chamber 8 combusting an air-fuel mixture coming out of the air vents 6, a combustor casing 10 shaped substantially as a cylinder that houses these components therein, and a combustor cover 11 shaped substantially as a disk which is located at an end of the combustor casing 10, to which the fuel nozzles 5 are attached, and which serves as a fuel feeding channel.

The air 101 compressed by the compressor 1 is led to the equipment 25 external to the gas turbine past the air extraction channel 26. Specifically, the external equipment 25 refers to plant equipment such as a humidifying tower and a recuperator. Past the external equipment 25, the compressed air 102 passes through the injection flow channel 27 to flow into the combustor 2 in the gas turbine. A temperature sensor 301 installed halfway along the injection flow channel 27 measures the temperature of the injected air. A signal of the temperature sensor 301 is input to the controller 400. The air 102 flowing thereafter into the combustor 2 flows between a liner flow sleeve 12 and the combustor liner 9. Part of the air 102 flows into the combustion chamber 8 as a cooling air 103 for the combustor liner 9. The rest of the air 102 serves as the combustion air 104 that flows into the combustion chamber 8 through the air vents 6 provided in the air vent plate 7.

The four fuel systems of the first embodiment are equipped with the fuel flow control valves 211 through 214, respectively. The angles of the fuel flow control valves 211 through 214 are controlled by signals coming from the controller 400 to control the flow rates of the fuels 201 through 204 individually.

As shown in FIG. 1, the combustor 2 of the first embodiment is furnished with multiple fuel nozzles 5, each of which is coupled to one of four fuel headers 231 through 234. In the first embodiment, the fuel header 231 is a substantially cylindrical space located at the center of the combustor axis. The remaining fuel headers 232 through 234 share the same center as the fuel header 231 and each constitute a substantially circular space having a radius different from that of the fuel header 231. The fuel header 232 is arranged to encircle the fuel header 231 peripherally; the fuel header 233 is arranged to encircle the fuel header 232 peripherally; and the fuel header 234 is arranged to encircle the fuel header 233 peripherally.

The four fuel headers 231 through 234 are supplied individually with the fuels 201 through 204. In this structure, the multiple fuel nozzles 5 may be grouped into the four fuel systems (formed by a group F1 of fuel nozzles 5 coupled to the fuel header 231, a group F2 of fuel nozzles 5 coupled to the fuel header 232, a group F3 of fuel nozzles 5 coupled to the fuel header 233, and a group F4 of fuel nozzles 5 coupled to the fuel header 234; see FIG. 4). The fuel systems can be controlled individually, and the fuel nozzles 5 belonging to each fuel system can be controlled collectively.

Figure 3:
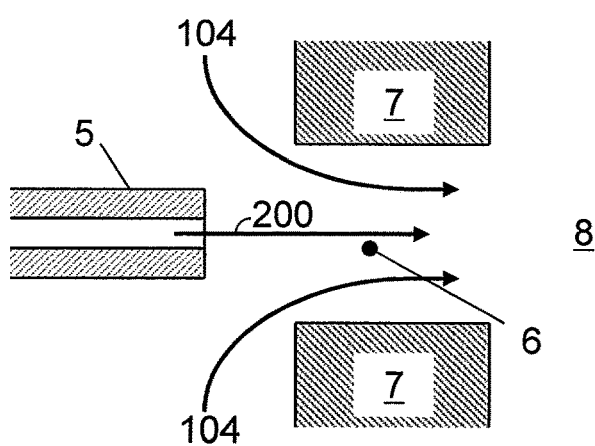
FIG. 3 is a diagram showing a detailed structure of a fuel nozzle and an air vent embodying the present invention.

FIG. 3 shows details of a fuel nozzle 5 and an air vent 6. Although FIG. 3 is used to explain one of the fuel nozzles 5 belonging to the group F1 coupled to the fuel header 231, the same structure applies to the other groups F2 through F4 as well.

Each fuel nozzle 5 is substantially cylindrical in shape. One end of the fuel nozzle 5 is coupled to the fuel header 231, and the fuel 201 flows inside the fuel nozzle 5. The other end of the fuel nozzle 5 is opposed in a substantially coaxial manner to an air vent 6 provided in the air vent plate 7. The fuel 201 is enclosed by the air 104 when passing through the air vent 6 and injected into the combustion chamber 8.

Figure 4:
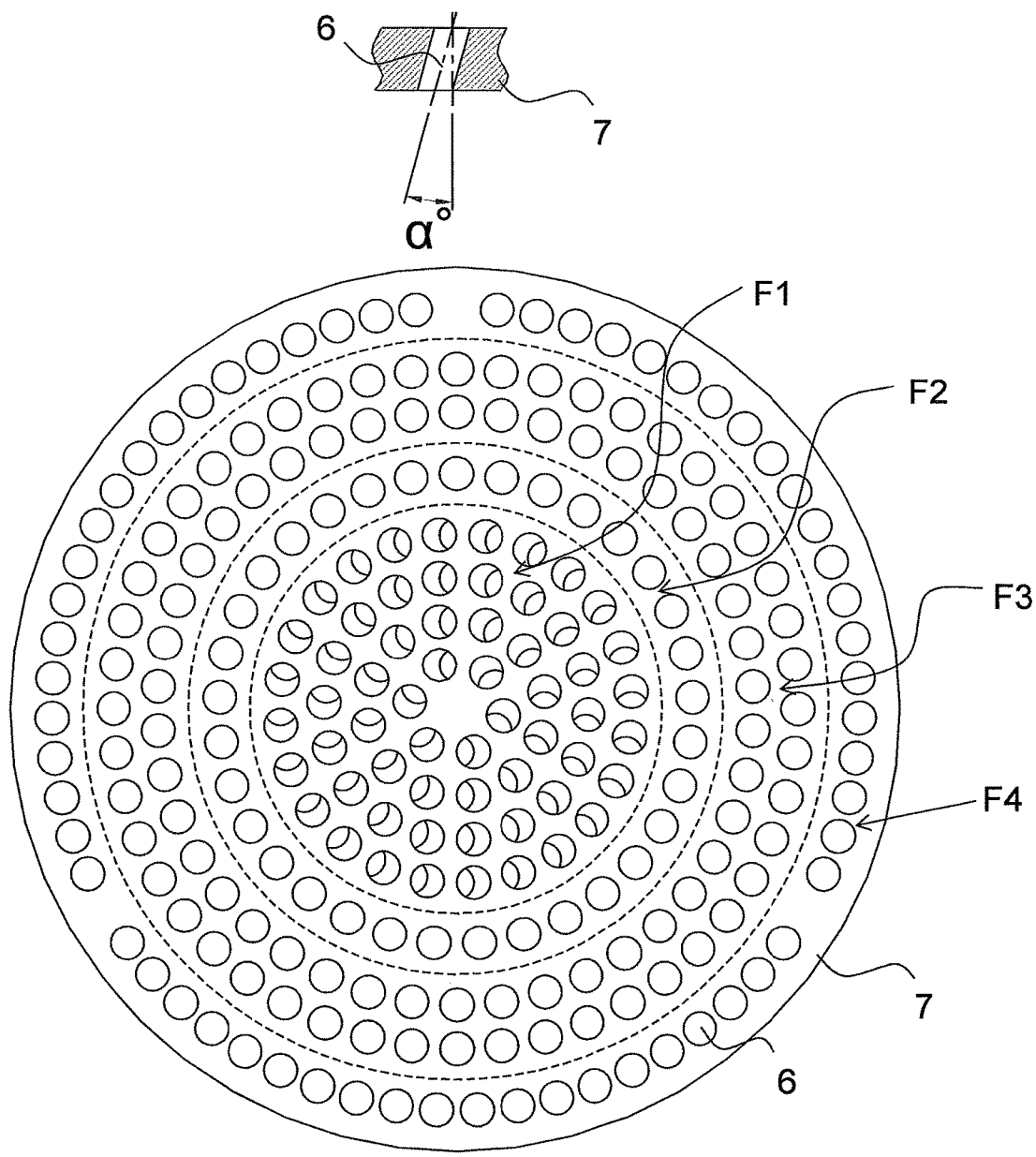
FIG. 4 is a bottom view of an air vent plate viewed from the downstream side of a combustor and embodying the present invention.

FIG. 4 is a bottom view of the air vent plate 7 viewed from the downstream side of the combustor. In the first embodiment, numerous air vents 6 (and the fuel nozzles 5, not shown, paired with the air vents) are arranged concentrically in eight circles. The innermost four circles of air vents 4 around the center (the first through the fourth circles) make up the first group (F1); the fifth circle forms the second group (F2); the next outer two circles (the sixth and the seventh circles) form the third group (F3); and the outermost circle (the eighth circle) constitutes the fourth group (F4). As shown in FIG. 1, the fuels 201 through 204 are supplied through flanges 41 through 44 attached to the fuel headers 231 through 234 belonging to the groups F1 through F4, respectively. The grouped structure of the fuel systems permits fuel staging that involves varying in stages the number of fuel nozzles 5 (i.e., number of fuel nozzles to be ignited) through which the fuels are supplied in keeping with the change in the fuel flow rate of the gas turbine. This improves combustion stability during partial load operation of the gas turbine while making low NOx combustion possible.

Also, the air vents in the innermost four circles (F1) are each skewed to have a predetermined angle (a degrees in FIG. 3) relative to the tangential direction of a pitch circle. The skewed vent formation swivels the entire air flow to generate a circulating flow that stables flames. The groups F2 through F4 around the group F1 have their flames stabilized by combustion heat from the centrally located F1 burners.

A method for operating the combustor 2 is explained next by use of FIGS. 1 and 4. First, at the time of ignition and in an early stage of warm-up (i.e., at partial rotating speed under no load condition) when the fuel flow rate is relatively low, the centrally positioned group F1 alone is used (with the fuel flow control valve 211 opened and with the fuel flow control valves 212 through 214 closed to supply only the fuel 201) for operation. As the rotating speed is raised and comes close to rated rotating speed under no load condition so that the air-to-fuel rate of the combustor as a whole is increased, the group F2 of air vents radially outside of the group F1 is fed with the fuel for operation (with F1+F2). That is, the fuels 201 and 202 are injected, with the fuel flow control valves 211 and 212 regulated to control the flow rates of the fuels 201 and 202. The action of increasing or decreasing the number of fuel systems supplied with fuels in the manner described above is called "fuel system switchover." With the first embodiment, under the partial rotating speed condition before the start of power generation, fuel system switchover is performed from the operation only with the group F1 to the operation with the groups F1+F2. Warm-up is then continued with the operation involving the groups F1+F2 until the rated rotating speed under no load condition is reached. In the subsequent process in which the load is raised, the fuel flow rate for the operation with the groups F1+F2 (i.e., total flow rate of the fuels 201 and 202) is increased to cope with the growing load.

When the load is further raised and the air-to-fuel ratio (fuel mass of air-fuel mixture divided by air mass) of the combustor 2 as a whole is increased accordingly, the group F3 of air vents radially outside of the group F2 is fed with the fuel 203 and is ignited for operation. The increase in the fuel flow during this time is controlled by the fuel flow control valves 211, 212 and 213 in a manner raising the electric power generation of the gas turbine in accordance with a load-up rate defined by a gas turbine start-up plan. The fuels distributed to the fuel systems represented by F1, F2 and F3 are supplied at a predetermined ratio that ensures stable combustion with minimum NOx generation.

During operation under high load condition where the load on the gas turbine is further raised, the flow rate of mostly the fuel 204 for the outermost air vent group F2 is increased or decreased to deal with the elevated load. During this time, the air-fuel mixture from the group F4 is mixed with the combustion gas from the groups F1 through F3 to reach high temperatures. This promotes oxidation of the fuels and thereby provides high combustion efficiency. Also, because air distribution is established in such a manner that the temperature upon completion of combustion remains lower than the temperature at which NOx generation becomes prominent (i.e., about 1600° C.), it is possible to perform combustion with minimum NOx generation from the group F4. Since the reaction is completed with very little fuel injected through the group F4, fuel system switchover can be performed consecutively so that turbine operability is improved.

Figure 5:
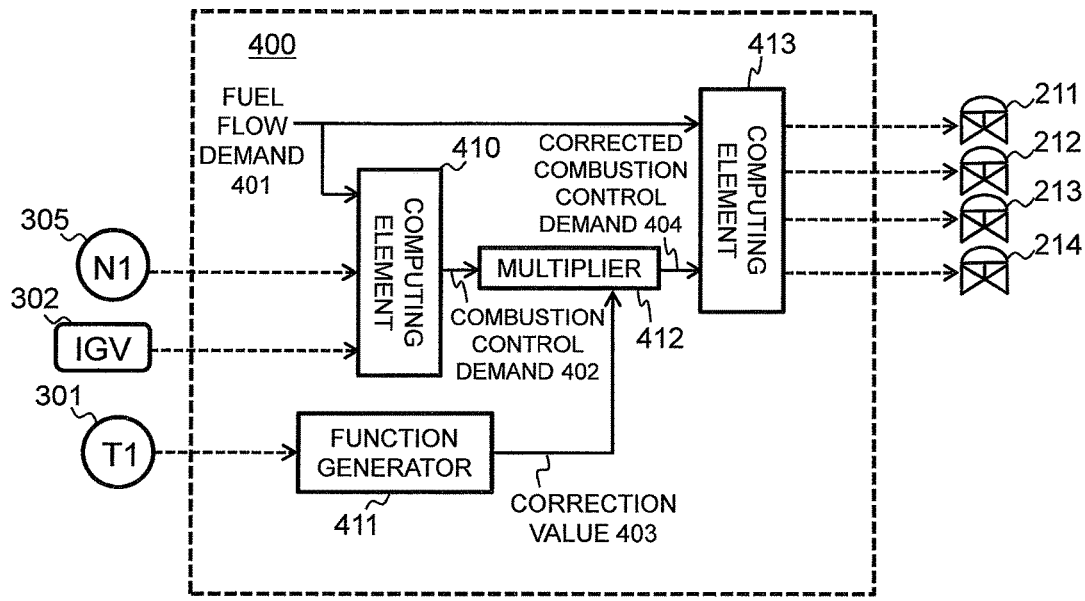
FIG. 5 is a block diagram of a controller of a gas turbine system as the first embodiment.

The controller (control device) 400 of the first embodiment is explained below in detail with reference to FIG. 5 showing a typical structure of the controller 400. In FIG. 5, the controller 400 includes a computing element 410 that outputs a combustion control demand 402 (combustion control demand computing element), a function generator 411 that outputs a correction value 403, a multiplier 412 that outputs a corrected combustion control demand 404 obtained by correcting the combustion control demand 402 with the correction value 403, and a computing element 413 that outputs angle demands to the fuel flow control valves 211, 212, 213 and 214 (fuel flow control valve angle demand computing element).

What is input to the computing element 410 are the rotating speed N1 of the gas generator 4 detected by the rotation speed indicator 305, the angle of the inlet guide vane 15 of the compressor 1 detected by an angle sensor 302, and an injected air temperature T detected by the temperature sensor 301. The fuel flow demand 401 is calculated in the controller 400, and the value of the calculated demand 401 is input to the computing elements 410 and 413. The fuel flow demand 401 may be calculated separately from an ignition control demand, a start-up control demand, a load control demand (or rotating speed control demand), and an exhaust gas temperature control demand, for example. On the basis of these input values, the computing element 410 outputs the combustion control demand 402. The combustion control demand 402 is an index indicative of the degree of combustion in the combustor 2 as a whole. In terms of the relations between input and output, the higher the fuel flow demand 401, the higher the combustion control demand 402 becomes. Also, the combustion control demand 402 tends to be higher, the lower the rotating speed N1 (output of the rotation speed indicator 305) of the gas generator 4 and the smaller the angle of the inlet guide vane (output of the sensor 302) of the compressor 1 (i.e., the lower the compressed air flow rate becomes).

The relationship between the fuel flow demand 401 and combustion performance is described next in order to explain the workings of the computing element 413. In terms of the performance of the combustor 2, when the value of the fuel flow demand 401 is smaller, the NOx emission rate is lower but combustion is less stable so that there is a higher possibility of flame-out. Conversely, when the value of the fuel flow demand 401 is larger, combustion is more stable but the NOx emission rate is higher. Thus when the corrected combustion control demand 404 (equal to the combustion control demand 402 where the output of the function generator 411 is 1; the same also applies hereunder) immediately after start-up is small, only one fuel system represented by F1 out of the four fuel systems F1 through F4 is used for combustion. Later, as the corrected combustion control demand 404 is raised, the number of fuel systems to be ignited (i.e., the number of fuel systems starting to be supplied with the fuels) is increased successively (i.e., F1+F2 followed by F1+F2+F3 followed by F1+F2+F3+F4) so that both low NOx generation and stable combustion are ensured. In this manner, the computing element 413 determines which of the fuel systems represented by F1, F2, F3 and F4 to ignite in accordance with the value of the corrected combustion control demand 404, computes the flow rates of the fuels 201, 202, 203 and 204 to be supplied to the fuel systems, and outputs corresponding angle demands to the fuel flow control valves 211, 212, 213 and 214.

There are predetermined values of the corrected combustion control demand 404 that trigger the computing element 413 to perform fuel system switchover (the values are called switchover threshold values, to be discussed later). It is assumed here that A0 stands for the value of the corrected combustion control demand 404 triggering switchover from F1 to F1+F2 (see FIG. 7), A1 for the value of the corrected combustion control demand 404 triggering switchover from F1+F2 to F1+F2+F3, and A2 for the value of the corrected combustion control demand 404 triggering switchover from F1+F2+F3 to F1+F2+F3+F4 (provided A0<A1<A2). Following a fuel system switchover, the increase in the fuel flow demand 401 raises the flow rates of the fuels supplied to the respective fuel systems. Following the next fuel system switchover in which a fuel system to be supplied anew with the fuel is added to the fuel systems already supplied with the fuels, the fuel flow rates of the fuel systems already supplied with the fuels drop temporarily but are more than compensated by the flow rate of the fuel supplied to the newly added fuel system. In this manner, following each fuel system switchover, the total flow rate of the fuel supplied to the combustor 2 is controlled to be increased monotonously (e.g., following the switchover from F1 to F1+F2, the flow rate for F1 becomes lower than when F1 alone was in effect. But the drop in the fuel flow rate for F1 is more than compensated by the fuel flow rate for F2 so that the total fuel flow rate is increased monotonously after the fuel system switchover).

Figure 6:
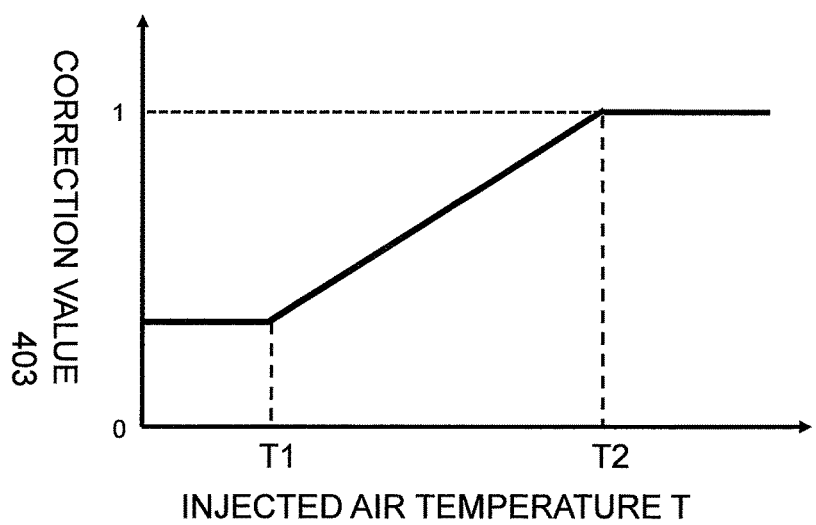
FIG. 6 is a diagram showing the relationship between injected air temperature and a correction value of a function generator, the relationship being used by a typical method for calculating the correction value.

The function generator 411 is explained next. As shown in FIG. 5, the input to the function generator 411 is the injected air temperature T and the output therefrom is the air temperature correction value 403. How the function generator 411 works is explained below with reference to FIG. 6. FIG. 6 is a graphic representation schematically showing the relationship between the input and the output to and from the function generator 411 in the controller 400. In FIG. 6, the horizontal axis represents the injected air temperature T as the input to the function generator 411, and the vertical axis denotes the correction value 403 as the output from the function generator 411.

In FIG. 6, where the injected air temperature T is higher than a predetermined temperature T2, the correction value is 1. As will be discussed later, the corrected combustion control demand 404 remains unchanged with regard to the yet-to-be-corrected combustion control demand 402. The reason for this is that when air temperature is sufficiently high at the time of start-up, the state of combustion is the same as in load operation so that the operation may be continued without temperature correction at start-up.

Where the injected air temperature T is lower than T2 and higher than T1, the correction value 403 is set to be smaller the lower the temperature becomes (i.e., when temperature drops from T2 toward T1 within the range between the two values, the correction value 403 is decreased monotonously). As a result, the apparent combustion control demand 404 input to the computing element 413 is smaller than the actual combustion control demand 402. As with the temperature T2, the temperature T1 is a predetermined temperature lower than the temperature T2.

Furthermore, where the injected air temperature T is lower than T1, the correction value 403 is set to be a constant value larger than 0 and smaller than 1. One objective for this setting is to protect high-temperature members such as the combustor and turbine from overheating through fuel system switchover if the temperature is lower than expected but is higher than a given combustion control demand. Another objective is to forestall unstable control of the next multiplier 412 executing zero divide or negative multiply.

Specifically, the temperature T1 should preferably be ambient air temperature or thereabout. For the first embodiment, the temperature T1 may be set to 15° C., for example. The temperature T2 should be sufficiently high in view of combustion performance. For the first embodiment, the temperature T2 may be set to 300° C., for example.

Figure 7:
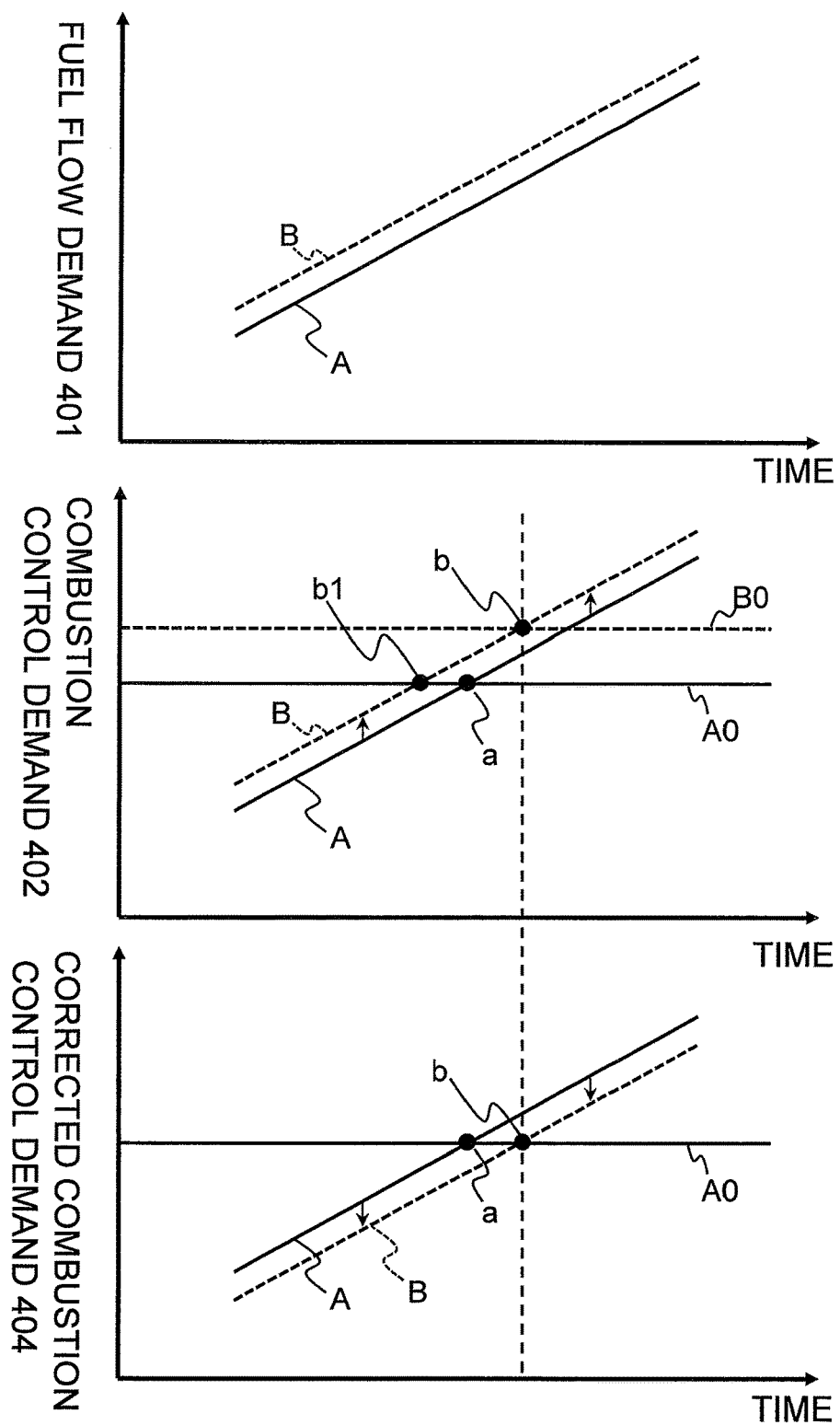
FIG. 7 is a group of diagrams showing the relationship between a fuel flow demand and time, the relationship between a combustion control demand and time, and the relationship between a corrected combustion control demand and time, the relationships being used by a typical method for correcting the combustion control demand based on air temperature.

Explained next are the combustion control demand 402 and the corrected combustion control demand 404 obtained through multiplication of the correction value 403 by the multiplier 412. In FIG. 7, all horizontal axes denote the time at which the gas turbine is started up. The vertical axis of the top subfigure stands for the behavior of the fuel flow demand 401, the vertical axis of the middle subfigure represents the behavior of the combustion control demand 402, and the vertical axis of the bottom subfigure denotes the behavior of the corrected combustion control demand 404. In each subfigure, a solid line A represents the case where the temperature T of the injected air flowing through the injection flow channel 27 is sufficiently high and exceeds the temperature T2 (see FIG. 6; where the correction value 403 is 1), and a broken line B denotes the case where the temperature T of the injected air is lower than T2 typically due to heat exchange with the external equipment 25 (where the correction value 403 is smaller than 1). Since the change in air-to-fuel ratio tends to be approximately the same as the change in the combustion control demand 402, the middle subfigure in FIG. 7 may be considered to represent the change in air-to-fuel ratio.

As shown in the top subfigure, the fuel flow demand 401 at the time of start-up of the gas turbine rises over time. Correspondingly, the total amount of fuel 200 injected into the combustor 2 is increased over time.

In the middle subfigure, a combustion control demand value A0 represents a threshold at which fuel system switchover can be made from F1 to F1+F2 with no problem on the solid line A. It is at a point in time "a" that the combustion control demand 402 reaches the threshold A0 on the solid line A.

With the solid line A in effect, the air temperature T exceeds T2 so that the correction value 403 in FIG. 6 is 1. In the bottom subfigure in FIG. 7, the corrected combustion control demand 404 is equal to the yet-to-be-corrected combustion control demand 402. At the point in time "a" in the bottom subfigure, the corrected combustion control demand 404 reaches the threshold A0, with fuel system switchover executed from F1 to F1+F2.

Meanwhile, with the broken line B in effect, the injected air temperature T is low so that the fuel flow rate necessary for start-up is slightly higher than on the solid line A as shown in the top subfigure. As a result, the combustion control demand 402 is slightly higher than on the solid line A, as indicated by the broken line B in the middle subfigure in FIG. 7. On the broken line B, a threshold B0 at which fuel system switchover can be made from F1 to F1+F2 with no problem is higher than the threshold value A0 on the solid line A. Fuel system switchover should preferably be made at a point "b" at which the broken line B intersects with the threshold B0. That is, when the air temperature T is lower than T2, fuel system switchover should preferably be made to F1+F2 at the point "b" at which the fuel flow rate of the currently-fed fuel system represented by F1 is raised. The reason for this type of switchover is that combustion becomes unstable due to the low air temperature T so that flame-out may occur if the switchover is made at the same threshold A0.

In the past, at the time of start-up even at a partial rotating speed under no load condition, fuel system switchover was controlled by use of the same threshold as in load operation. If the same control method was applied to the two-shaft gas turbine, with the injected air temperature T dropping lower than T2 so that the combustion control demand 402 became as indicated by the broken line B for example, fuel system switchover would take place at a point b1 at which the broken line B intersects with the threshold A0. The result was unstable combustion leading to possible flame-out.

The above problem is addressed by the first embodiment as follows: Even if the combustion control demand 402 is raised due to the drop in the injected air temperature T, the function generator 411 and the multiplier 412 function to output to the computing element 413 the corrected combustion control demand 404 obtained by decreasing the combustion control demand 402 through correction. This makes it possible to perform fuel system switchover in an optimally timed manner even if the computing element 413 utilizes the same threshold A0 as when the injected air temperature T is high (higher than T2). As a result, where the injected air temperature T is lower than T2 as opposed to the case where the injected air temperature T exceeds T2, the flow rate of the fuel supplied to the currently-fed fuel system F1 is increased among the four fuel systems F1, F2, F3 and F4 before fuel system switchover is executed (from F1 to F1+F2).

With the broken line B in effect, the correction value 403 is set so that the combustion control demand 402 will reach the threshold B0 when the corrected combustion control demand 404 attains the switching threshold A0 (B0 is the initial threshold increased from A0 due to the drop in the injected air temperature (i.e., increase in air-to-fuel ratio)). Where the broken line B is not in effect (at temperatures lower than the temperature T2), the correction value 403 is set so that the combustion control demand 402 will reach the initial switching threshold when the corrected combustion control demand 404 attains A0.

Where the above structure is implemented, the correction value 403 in effect when the injected air temperature T is lower than T2 is set to be larger than 0 and smaller than 1, as shown in FIG. 6. As a result, the corrected combustion control demand 404 becomes lower than the solid line A as indicated by the broken line B in the bottom subfigure in FIG. 7. For example, the correction value 403 is set so that fuel system switchover will occur when the corrected combustion control demand 404 reaches the threshold A0 at the point "b." This is the same point "b" at which fuel system switchover should preferably take place as discussed above with reference to the middle subfigure in FIG. 7.

As a result, when the correction value 403 is set as explained above in conjunction with the first embodiment, the same threshold A0 may be used for control purposes regardless of the air temperature T being high or low. Fuel system switchover can be performed in a unified manner regardless of the temperature (high or low) of the external device 25 at the time of start-up or the state of the gas turbine (operating at rated rotating speed or not, or under load condition or not). This enables the combustor 2 to operate stably with low NOx generation.

Second Embodiment

The second embodiment of the present invention is explained next. In a plant furnished with the external equipment 25 such as the humidifier and recuperator, fuel control based on the change in air temperature as with the present invention is needed primarily at the time of start-up and for several to a dozen or so minutes thereafter. Once the plant is warmed up after that initial time period, a drastic drop in air temperature is inconceivable except for defective indications given erroneously by the temperature sensor 301. Thus the second embodiment of the present invention provides additional control for limiting the correction of the combustion control demand 402 based on the air temperature T to a predetermined time period involving start-up.

Figure 8:
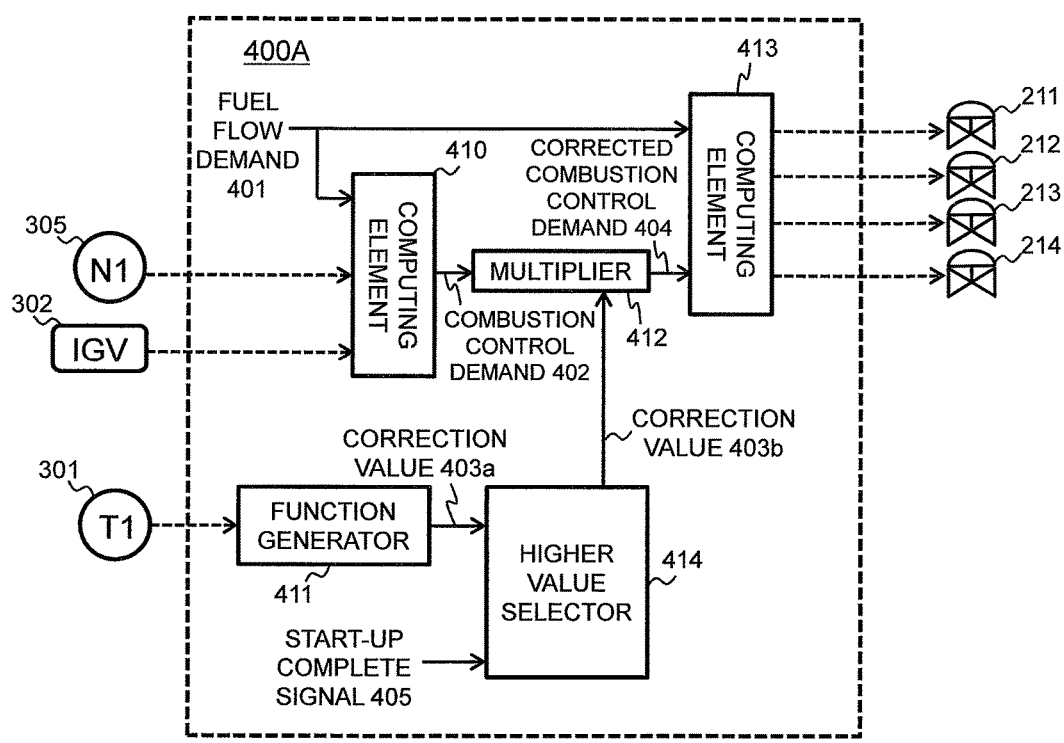
FIG. 8 is a block diagram of a controller of a gas turbine system as a second embodiment of the present invention.

FIG. 8 is a block diagram of a controller 400A constituting the second embodiment of the present invention. The difference between the controller 400A in FIG. 8 and the controller 400 in FIG. 5 is that a correction value 403a output from the function generator 411 is input to a higher value selector 414 which in turn compares the input correction value 403a with a start-up complete signal 405 and outputs the larger of the two compared values as a correction value 403b to the multiplier 412. The rest of the workings of the controller are the same as in the first embodiment and thus will not be discussed further.

Figure 10:
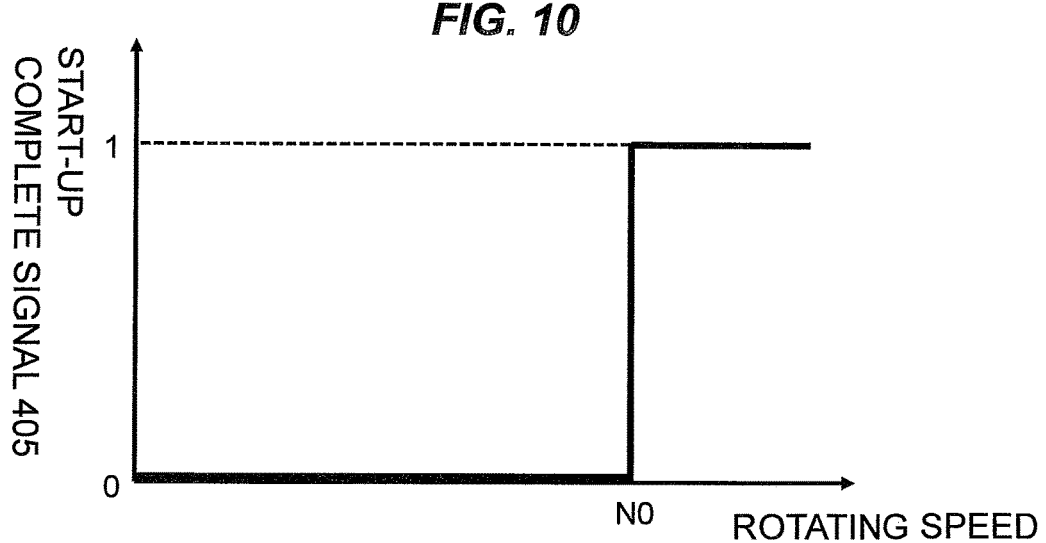
FIG. 10 is a relationship diagram for calculating a start-up complete signal based on the rotating speed of a gas generator.

The start-up complete signal 405 may be generated by the function generator of which the behavior is shown in FIG. 10, for example. This function generator determines whether gas turbine start-up is completed on the basis of the rotating speed of the gas generator (i.e., output of the rotation speed indicator 305) or the rotating speed of the power turbine (output of the rotation speed indicator 306), the function generator outputting 0 during start-up and 1 upon completion thereof. In the example of FIG. 10, the value 1 is output as the start-up complete signal 405 when the rotating speed of the gas generator reaches the rated rotating speed N0. The higher value selector 414 compares the value of the start-up complete signal 405 with the correction value 403a before outputting the higher of the two compared values as the correction value 403b. Thus the higher value selector 414 outputs 1 as the correction value 403b even if the air temperature becomes lower than T2 upon completion of gas turbine start-up so that the correction value 403a is smaller than 1. This keeps the corrected combustion control demand 404 equivalent to the combustion control demand 402 (i.e., the combustion control demand is not corrected).

The above-described workings of the controller limit the correction of the air temperature T to the time period of start-up. For example, normal control of the combustor 2 can be maintained even if the signal from the temperature sensor 301 turns out to be abnormal for some reason in a plant where load operation is continued for one year after the start-up.

Figure 11:
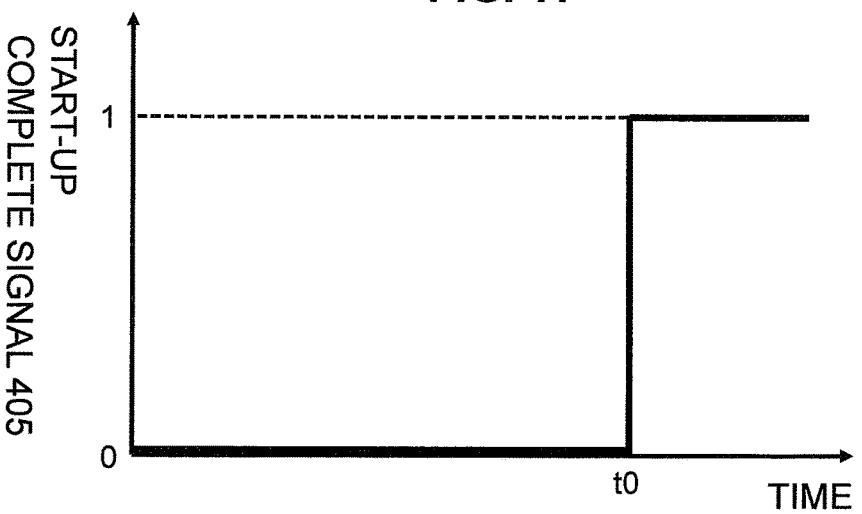
FIG. 11 is a relationship diagram for calculating the start-up complete signal based on the time that has elapsed since a gas turbine start-up.

In another variation, the time t0 required for the external equipment 25 of the plant to warm up may be grasped beforehand. In this case, the start-up complete signal 405 may be output on the basis of the elapsed time from the beginning of start-up, as shown in FIG. 11. In the example of FIG. 11, the value 0 is output as the start-up complete signal 405 when the elapsed time from the beginning of gas turbine start-up is less than t0. When the elapsed time attains t0, the value 1 is output as the start-up complete signal 405. With the start-up complete signal 405 output in this manner in accordance with the elapsed time from the beginning of start-up, normal control of the combustor 2 can be maintained even if the signal from the temperature sensor becomes faulty. The time t0 should preferably be set to be longer than the time it takes to reach the rotating speed N0 in view of the time required for the warm-up of the external equipment 25. In any case, the time t0 may be determined independently of the rotating speed N0 in FIG. 10.

Third Embodiment

Figure 9:
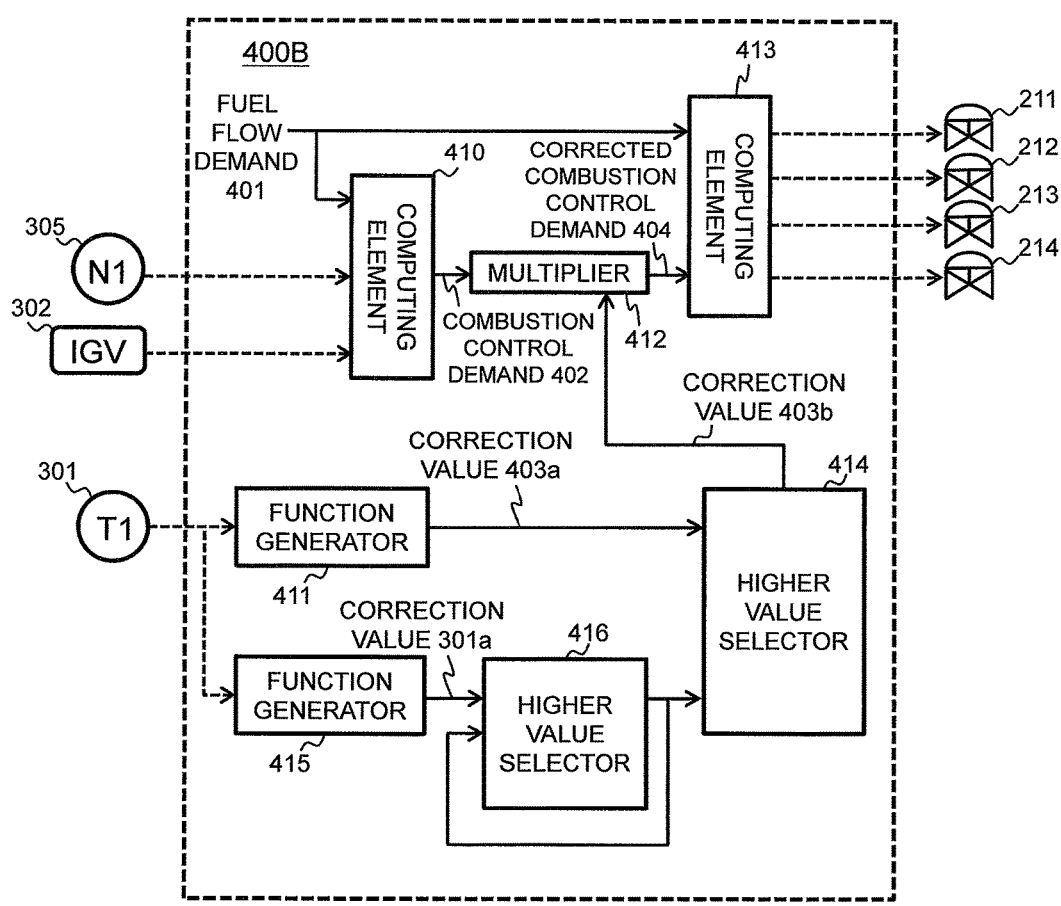
FIG. 9 is a block diagram of a controller of a gas turbine system as a third embodiment of the present invention.
Figure 12:
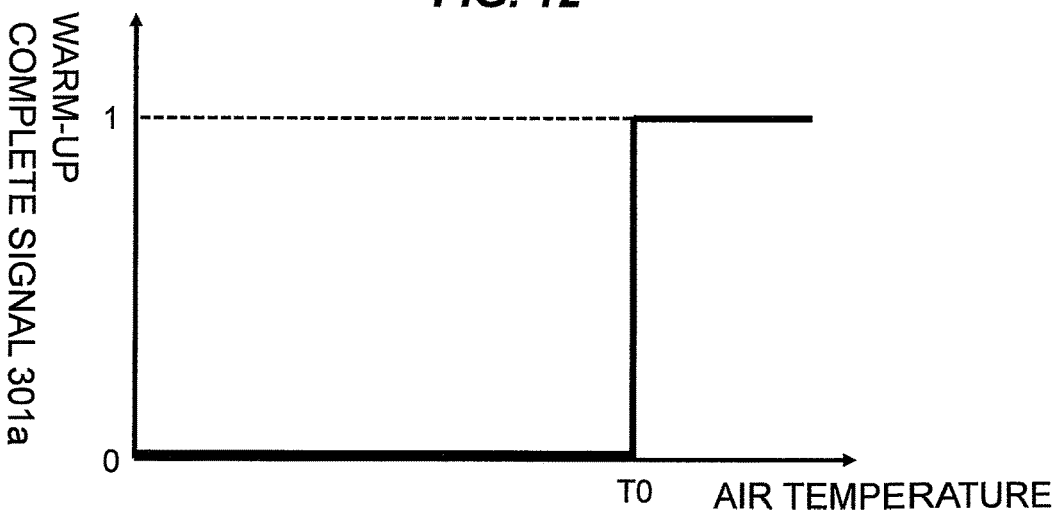
FIG. 12 is a relationship diagram for calculating a warm-up complete signal based on air temperature.

A controller 400B shown in FIG. 9 may also be adopted as another embodiment of the present invention. FIG. 9 is a block diagram of the controller 400B constituting the third embodiment of the invention. FIG. 12 is a diagram depicting the relationship between the air temperature T and a warm-up complete signal 301a output from a function generator 415 in the controller 400B.

The controller 400B shown in FIG. 9 includes the function generator 415 and a higher value selector 416. As shown in FIG. 12, the function generator 415 outputs 0 as the warm-up complete signal 301a when the sensed temperature T from the temperature sensor 301 is lower than T0, and outputs 1 when the sensed temperature T attains T0. The controller 400B inputs to the function generator 415 the air temperature T output from the temperature sensor 301. When the air temperature T exceeds the temperature threshold T0 in FIG. 12, the controller 400B outputs 1 as the warm-up complete signal 301a to the higher value selector 416. Once 1 is input as the output signal 301a from the function generator 415, the higher value selector 414 maintains the output 1. As a result, after the air temperature T reaches T0, the combustion control demand will not be corrected even if the temperature T drops below T0.

In the manner described above, whether or not warm-up is complete can be determined on the basis of the air temperature that directly affects combustion performance. This permits more accurate combustor control than if the completion or not of warm-up is determined in accordance with the rotating speed or with the time shown in FIGS. 10 and 11. Thus the correction of the air temperature in the combustion control demand may be limited to the time period of start-up at low temperature. Normal control of the combustor 2 can then be maintained even if the signal from the temperature sensor 301 becomes faulty for some reason in a plant of which the load operation is continued for one year after start-up, for example.

In the foregoing paragraphs, it was explained that fuel system switchover is made from F1 to F1+F2 under partial rotating speed condition. Alternatively, the invention may also be applied to the case where the switchover is made to a fuel system group subsequent to F1+F2 under partial rotating speed condition. In this case, the switchover to the next fuel system group may be executed after the flow rate of the fuel supplied to each fuel system is made higher than when the injected air temperature is sufficiently high.

Also in the foregoing paragraphs, it was explained that the external equipment 25 is interposed between the air extraction channel 26 and the injection flow channel 27. Alternatively, the present invention may also be applied to the case where the air extraction channel 26 and the injection flow channel 27 are directly coupled with each other to form a bypass channel (i.e., the external equipment 25 is not provided), the bypass channel causing a temperature drop in the compressed air 101 or 102 induced by heat exchange between the channel and the air passing therethrough.

Also in the foregoing paragraphs, it was explained that when the injected air temperature T is changed, the combustion control demand is corrected to perform fuel system switchover control on the basis of the common switchover threshold A0. Alternatively, the same type of control may be executed by having the combustion control demand 402 input directly to the computing element 413 so as to change the switchover threshold in accordance with the injected air temperature T (i.e., where the above-described broken line B is in effect, the switching threshold is changed to B0).

The invention is not limited to the foregoing embodiments but allows various modifications without departing from the scope of the invention. For instance, the invention is not limited by systems that comprise all the components described in the above embodiments, but includes systems in which some of the components are absent. Further, certain components of an embodiment of the invention can be added to another embodiment of the invention or replaced by components of another embodiment of the invention.

What is claimed is:

1. A two-shaft gas turbine system comprising:
   a compressor having an intake equipped with an inlet guide vane;
   a combustor having a plurality of fuel systems configured to be supplied with fuel independently of one another and to generate combustion gas by combusting the fuel from the fuel systems and air compressed by the compressor;
   a high-pressure turbine coupled coaxially with the compressor and rotated by the combustion gas from the combustor to drive the compressor;
   a low-pressure turbine having a shaft structure independent of the high-pressure turbine and rotated by exhaust gas from the high-pressure turbine to drive a load;
   an air extraction channel configured to extract the air compressed by the compressor;
   external equipment configured to take the air through the air extraction channel, process the air in a predetermined manner, and discharge the processed air;
   an injection flow channel for configured to feed the air discharged from the external equipment back to the combustor; and
   a controller configured to control a flow rate of the fuel supplied to each of the fuel systems based on an air flow rate of the compressor, a flow rate of the fuel supplied to the combustor, and a temperature of the air in the injection flow channel,
   wherein the controller, at a time of start-up of the gas turbine, is further configured to:
   control a timing when the fuel is newly added among the fuel systems based on the air flow rate of the compressor, the flow rate of the fuel supplied to the combustor, and the temperature of the air in the injection flow channel, and
   when the temperature of the air in the injection flow channel is lower than a predetermined value, increase the flow rate of the fuel supplied to each of the fuel systems currently supplied with the fuel among the fuel systems.

2. The two-shaft gas turbine system according to claim 1, further comprising:
   an angle sensor for the inlet guide vane;
   a rotation speed indicator for the compressor or for the high-pressure turbine;
   a flow sensor for the fuel to be supplied to the combustor; and
   a temperature sensor for the air in the injection flow channel;
   wherein the controller, at the time of start-up of the gas turbine, is further configured to control the flow rate of the fuel supplied to each of the fuel systems based on the air flow rate of the compressor calculated from the output of the angle sensor and from the output of the rotation speed indicator, the output of the flow sensor, and the output of the temperature sensor.

3. The two-shaft gas turbine system according to claim 1, wherein the controller, at the time of start-up of the gas turbine, is further configured to:
   calculate a combustion control demand based on the air flow rate of the compressor, the flow rate of the fuel supplied to the combustor, and the temperature of the air in the injection flow channel, and
   control the timing when the fuel is added from among the fuel systems based on the combustion control demand, wherein the timing when the fuel is added from among the fuel systems is specified by a switchover threshold value which is a predetermined value of the combustion control demand, and correct the combustion control demand such that the combustion control demand decreases as the temperature of the air in the injection flow channel decreases, when the temperature of the air in the injection flow channel is lower than the predetermined value.

4. The two-shaft gas turbine system according to claim 3, wherein the controller is further configured to:

not correct the combustion control demand after the start-up of the gas turbine is completed.

5. The two-shaft gas turbine system according to claim 3, wherein the controller, at the time of start-up of the gas turbine, is further configured to:

determine whether warm-up is completed or not based on the temperature of the air in the injection flow channel, and to not correct the combustion control demand after the warm-up is completed.

6. A control method for a two-shaft gas turbine system including a compressor compressing air, a combustor having a plurality of fuel systems configured to be supplied with fuel independently of one another and generating combustion gas by combusting the fuel from the fuel systems and the air compressed by the compressor, a high-pressure turbine coupled coaxially with the compressor and rotated by the combustion gas from the combustor to drive the compressor, and a low-pressure turbine having a shaft structure independent of the high-pressure turbine and rotated by exhaust gas from the high-pressure turbine to drive a load, the control method comprising:

extracting the air compressed by the compressor;

introducing the extracted air to external equipment, processing the extracted air in a predetermined manner, and discharging the processed air;

feeding the air discharged from the external equipment to the combustor;

controlling, at a time of start-up of the gas turbine, a timing when the fuel is added from among the fuel systems based on the air flow rate of the compressor, the flow rate of the fuel supplied to the combustor, and the temperature of the air discharged from the external equipment; and when the temperature of the air discharged from the external equipment is lower than a predetermined value, increasing, at the time of start-up of the gas turbine, the flow rate of the fuel supplied to each fuel system currently supplied with the fuel in the fuel systems.

\* \* \* \* \*